United States Patent
Melsen et al.

(10) Patent No.: US 6,877,282 B2
(45) Date of Patent: Apr. 12, 2005

(54) LAMINATED PLATE-SHAPED ROOF FLASHING MATERIAL

(75) Inventors: Michael Melsen, Lemming (DK); Holger Nissen, Gedved (DK)

(73) Assignee: VKR Holdings A/S, Søborg (DK)

( * ) Notice: Subject to any disclaimer, the term of this patent is extended or adjusted under 35 U.S.C. 154(b) by 360 days.

(21) Appl. No.: 10/204,907

(22) PCT Filed: Feb. 28, 2001

(86) PCT No.: PCT/DK01/00134
§ 371 (c)(1),
(2), (4) Date: Aug. 26, 2002

(87) PCT Pub. No.: WO01/65029
PCT Pub. Date: Sep. 7, 2001

(65) Prior Publication Data
US 2003/0009953 A1 Jan. 16, 2003

(30) Foreign Application Priority Data
Feb. 29, 2000 (DK) ........................ 2000 00320

(51) Int. Cl.⁷ .............................. E04D 13/14
(52) U.S. Cl. .................... 52/60; 52/58; 52/97; 52/200; 428/184; 428/458; 428/593; 428/615
(58) Field of Search ............... 52/58–62, 97, 52/200, 219, 302.6; 428/181–184, 141, 148, 458, 607, 615, 689

(56) References Cited

U.S. PATENT DOCUMENTS

| | | |
|---|---|---|
| 4,462,190 A | 7/1984 | Allen |
| 4,966,819 A * | 10/1990 | Schatz et al. ............... 428/457 |
| 5,053,266 A * | 10/1991 | Hesketh et al. ............. 428/182 |
| 5,142,837 A * | 9/1992 | Simpson et al. .............. 52/409 |
| 5,899,026 A * | 5/1999 | Williams et al. ............... 52/58 |
| 6,280,856 B1 * | 8/2001 | Andersen et al. ........... 428/593 |
| 6,457,279 B1 * | 10/2002 | Jacobsen et al. ............... 52/58 |
| 6,502,353 B2 * | 1/2003 | Hofmann ....................... 52/58 |
| 6,503,601 B1 * | 1/2003 | Edvardsen .................. 428/174 |

FOREIGN PATENT DOCUMENTS

| | | |
|---|---|---|
| DE | 27 34 004 A1 | 2/1979 |
| DE | 40 32 058 A1 | 5/1991 |
| DE | 298 04 503 U1 | 7/1998 |
| EP | 0632170 A2 | 1/1995 |
| GB | 1095393 | 12/1967 |
| GB | 2 184 685 A | 7/1987 |
| GB | 2 337 771 A | 12/1999 |
| JP | 2003-105936 * | 4/2003 |
| WO | WO 9306318 A1 | 4/1993 |
| WO | WO 94/00655 * | 6/1994 |
| WO | 95/31620 | 11/1995 |
| WO | 99/13180 | 3/1999 |

* cited by examiner

*Primary Examiner*—Winnie Yip
(74) *Attorney, Agent, or Firm*—Merek, Blackmon & Voorhees, LLC

(57) ABSTRACT

A pliable, ductile plate-shaped roof flashing is disclosed. The roof flashing has a laminate structure comprising a composite layer and a foil sheeting on one or both sides of the composite layer. The composite layer comprises a carrier material and one or more non-structural constituents. At least one of the non-structural constituents comprises a heavy metal compound having a density higher that 3.5 g/ml.

18 Claims, 1 Drawing Sheet

LAMINATED PLATE-SHAPED ROOF FLASHING MATERIAL

TECHNICAL FIELD

Figure 1:
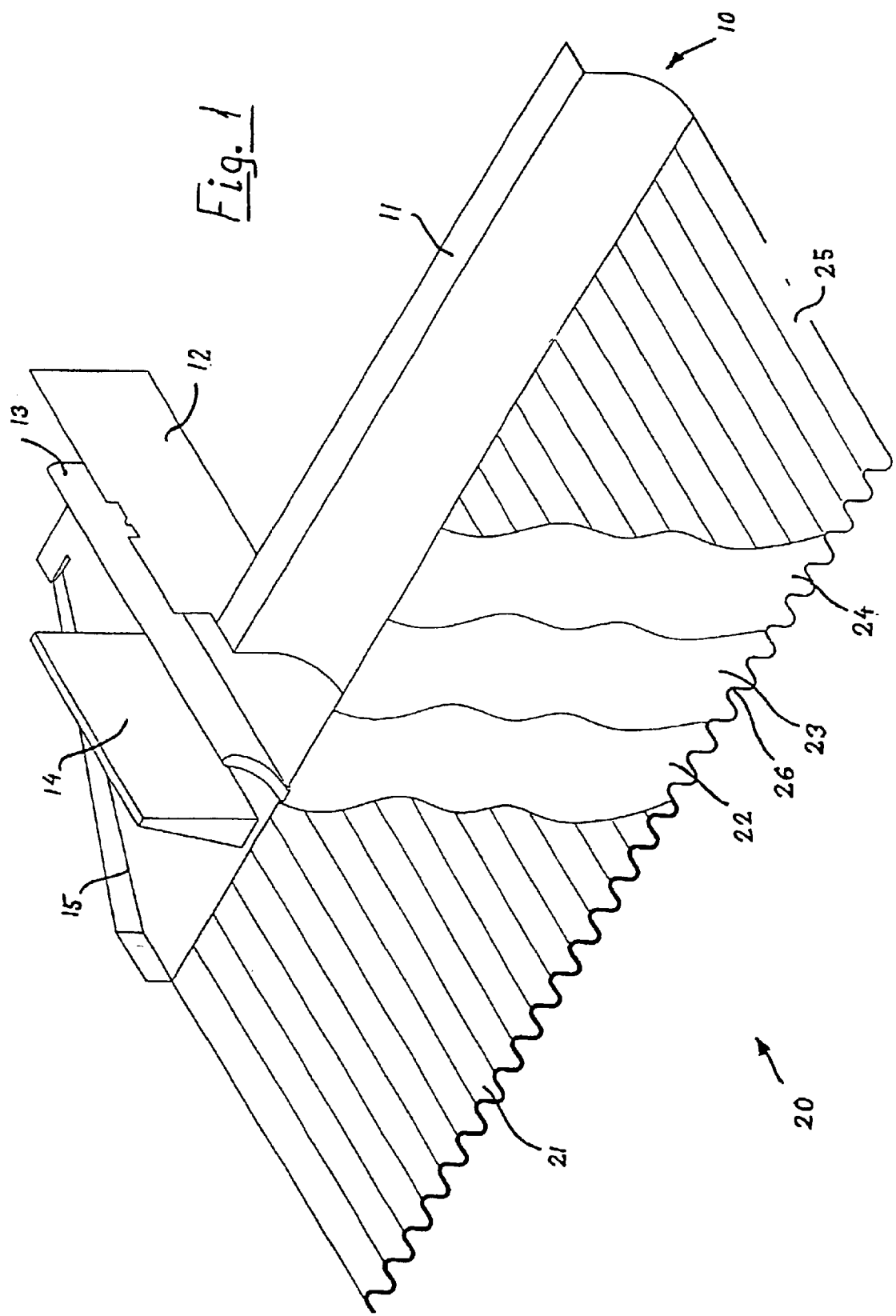

The invention relates to a pliable, ductile plate-shaped roof flashing having a laminated structure, the laminate comprising a composite layer and a foil sheeting on one or both sides of the composite layer.

BACKGROUND ART

Flashing materials in the form of plate members or skirts are used in the manufacturing of sealed joints between building structures penetrating a roof surface, for example a sealed joint between the main frame of a window installed in a roof and the surrounding roofing, in particular as a skirt-shaped flashing at the lower horizontal member of the main frame.

Such materials have traditionally been constituted by lead plates of a thickness of approximately 1 mm. Lead as a flashing material has a number of advantages as it is very easy to plastically deform with only a very limited elasticity, i.e. the lead plate substantially stays in the form into which it is initially bend without any elastic bouncing back. This inherent feature of lead is of great advantage when a lead-skirt as part of an already attached flashing is shaped directly onto for example an undulated roof surface, in which case the skirt cannot be bend in excess in order to compensate for possible elastic re-bouncing.

Although lead for most purposes is almost non-elastic, there may be a minimal re-bouncing, however, as lead is a very heavy material, gravity alone will help the lead-skirt to be elastically bend into close contact with the roof surface. Further, the high density of lead and the corresponding high weight will also prevent the skirt from being bend backwards during storming weather.

Indeed, lead also has some very well known draw backs as it is environmentally harmful, due to its weight expensive to transport and handle and in some aspects difficult to apply, for example when joining together different lead elements. Further, lead may oxidise and subsequently leave streaky deposits on the surrounding roof surface.

In order to avoid the economical and environmental problems involved by the traditional use of lead in flashing materials, it has been suggested to manufacture flashings as sandwich constructions in which, typically, a stress damping and stabilizing core layer of ductile material is completely covered on one side by a foil sheeting. The core layer has typically been made out of polymeric material or bitumen product, and the foil has typically been a thin metal foil, preferably aluminium foil. Bitumen as a product class is normally adhesive at ambient temperatures which will assure that it will adhere to and stabilize the foil, however, when a non-adhering core material is used it may be necessary to coat the core material with a pressure-sensitive adhesive coating. Such flashing materials are disclosed in for example Danish Patent Specifications No. 148 064 and No. 145 509 as well as in German patent specification DE-A-4 032 058.

For use on roof surfaces in the form of undulated tiles with very deep troughs, the above discussed sandwich constructions has been developed further into wave-corrugated and pleated designs, in order to obtain a sufficiently manual deformability and stretchability to enable a good fit between the flashing and roofing.

However, even with these improved designs it has turned out to be difficult to obtain a close as well as a permanent fit between the flashing and the roof surface.

Correspondingly, flashings of the sandwich type has been proposed in which a further layer or structure has been embedded or added to the core layer, for example as an embedded metal mesh or grid as disclosed in for example GB-A-2 184 685 or WO 95/31620, as an embedded polymeric grid structure as in DE-U-298 04 503 or as an additional foil as in WO 99/13180. However, these constructions add considerably to the cost of manufacture and problems have also been encountered when the wire material of the metal meshes during the mounting procedures brake and subsequently penetrate the material in which they are embedded as well as the covering foil, this allowing water to enter.

GB-A-1 095 393 discloses an adhesive laminate, which may be used, for example, to provide a water and dustproof seal to joints in buildings. The laminate comprises a self-adhesive bituminous composition coated onto a flexible protective layer. The bituminous composition may contain a filler material, preferably comprising both fibrous and powdered filler. The powdered filler materials suggested are ground limestone silica and calcium carbonate surface-treated with stearic acid.

The lead-free flashing materials suggested in the prior art have had difficulty in gaining a footing in the market, as a competitive and equal alternative of lead flashings. Instead attempts encompassing efforts to improve traditional lead-flashings through wave pleated or folded designs, in which the lead thickness has been reduced, have been made to provide a good weather-proofness of the lead-flashing by painting or lacquering it.

Therefore, having regard to the above, it is the object of the present invention to provide an improved flashing material which has one or more of the above described desirable features of lead-flashings, i.e. being easy to bend with only very limited elastic-deformation properties as well as having a high density, and which is moreover easy and cheap in manufacture.

DISCLOSURE OF THE INVENTION

Accordingly, the invention pertain to a pliable, ductile plate-shaped roof flashing having a laminate structure, the laminate comprising a composite layer and a foil sheeting on one or both sides of the composite layer, wherein the composite layer comprises a carrier material and one or more non-structural constituents, at least one of said non-structural constituents comprising a heavy metal compound having a density higher than 3.5 g/l.

The roof flashing with the composite layer comprising the carrier material and at least one additional non-structural constituent give rise to one or more of the above-identified lead like properties.

By the term "non-structural" is meant a constituent, which in itself does not form a rigid sheet or plate-like structure, as is the case for the above-discussed mesh or grid structures. Rather, the non-structural constituents are dispersed in the carrier material as separate entities. By "heavy metal compound" is meant a compound with a density higher than 3.5 g/ml and comprising of consisting of a heavy metal. Preferably the heavy metal compound has a density of 4.5 g/ml or more. A heavy metal is an element in the periodical system, which have a density higher than 3 g/ml.

In a first aspect of the invention, the composite layer comprises one or more non-structural constituents comprising a heavy metal compound having a density higher than 3.5 mg/l, which give rise to a composite layer material which has a higher density than the carrier material, yet substantially being as plastic deformable as the carrier material. By the latter is meant a composite material, which requires less than five times the force needed for a given deformation of the carrier material, preferably less than twice the force.

The non-structural constituent comprising a heavy metal compound is usually present in the carrier matrix as a dispersion of solid particles. The shape of the solid particles may vary considerably, however, it is generally preferred that the particles have a mean particles diameter less that 2 times, preferable less than 5 times the thickness of the composite layer. Preferably the particles comprising the heavy metal compound are uniformly distributed in the carrier matrix to obtain a flashing with the same properties through out the entire plate. To obtain a high density of the non-structural constituent it may be preferred to use metal particles comprising a pure heavy metal or an alloy thereof. However, some heavy metals, like iron, tend to oxidize when exposed to normal whether conditions if the heavy metal is not sufficiently protected in the carrier matrix. Thus, it may be preferred to use a non-structural constituent, wherein the heavy metal compound is bound in a chemical compound.

Moreover, heavy metals bound in a chemical compound, such as in inorganic salt, are usually less expensive relative to the pure heavy metal or alloys thereof.

The non-structural constituent is usually based on an organic or inorganic material of a mineral, ceramic, metallic or polymeric nature comprising a heavy metal, either as metal particles as such or as metal bound in a chemical compound. Examples of suitable heavy metals are barium, iron, silver, molybdenum and copper. Preferred heavy metal compounds are inorganic salts or oxides of the above heavy metals. Examples of suitable salts are the chloride, sulphate, sulphide, or nitrate salt of the above metals. A preferred heavy metal compound is barium sulphate due to the easy accessibility and low price. Generally, durable non-structural constituents is preferred over easy degradable. In the event the protective foil is damaged it is of importance that the non-structural constituents are not degraded by the whether, e.g. acid-containing rain. Barium sulphate fulfils this requirement, whereas calcium carbonate, which does not qualify as a heavy metal compound, will be dissolved by acid-containing rain.

As particulate material further compounds not containing heavy metals may be used. As an example, it may be advantageous to include carbon black in the composite composition.

In a second aspect of the invention, the composite layer comprises one or more non-structural constituents which give rise to a composite layer material which is less elastic than the carrier material, yet substantially being as plastic deformable as the carrier material. By the latter is meant a composite material, which requires less than five times the force needed for a given deformation of the carrier material, Preferably less than twice the force.

By the term "elastic" reference is made to the relative elongation possible before plastic deformation takes place, i.e. low elasticity in this context means that only a small relative elongation/deformation can take place before plastic deformation occurs.

The above plastic deformability is obtained by including in the composite layer material a further non-structural constituent, which comprises a filamentous material. In a preferred embodiment the additional constituent is based on an organic or inorganic non-rigid web like sheet or non-structural filamentous material, preferably consisting of fibres, filaments, rovings and the like based on materials like mineral, ceramic, metallic or polymeric components or compositions or compounds thereof. Examples of suitable filamentous material are asbestos, rock wool, and uralite fibres. For preferred embodiments the filaments have a length, which is less than 10 cm, more preferred less than 5 cm and most preferred less than 1 cm. It may be preferred to arrange the filaments with a predominant orientation to obtain an increase directional stability.

The amount of non-structural constituents in the carrier matrix may vary in accordance with the intended use of the flashing. It has turned out that the composite layer material can contain up to 95 percent by weight of the non-structural material. To obtain a sufficient density of the composite layer material it is preferred that more than 50 percent of the composite layer material is constituted by the non-structural material. A better pliable and ductile flashing is obtained if the non-structural constituent constitutes more than 75 percent by weight of the composite layer material. A preferred density of the composite layer is at least 2 g/ml and more preferred 2.5 g/ml or higher. Generally, the composite layer of the roof flashing has a thickness of 0.5 to 5 mm. Preferably the thickness is of the magnitude 0.7 to 2 mm.

In preferred embodiments non-structural constituents are used which interact with and interrupt the structure of the carrier material in such a way that the resulting composite layer material is less elastic than the carrier material, yet substantially being as plastic deformable as the carrier material.

Presently, preferred carrier materials are polymeric materials, such as PVC or butyl rubber (styrene-butadiene radial block copolymer), and bitumen products. Bitumen may be preferred is some aspects of the invention because it is sufficient tacky at ambient temperatures for allowing the lamination with a foil sheeting. When environmental considerations are important butyl rubber is generally preferred. However, the tackiness of butyl rubber (and PVC) is usually not sufficient for the production of a durable laminate with the foil sheeting. Therefore, it may be necessary or desired to use an adhesive for the lamination.

As has been discussed above, the composite core material of the present invention may be used in flashings having two or more layers, i.e. laminates or sandwich constructions. According to the invention the composite material is covered on one or both sides with a foil sheeting, for example of a mineralic, ceramic, metallic or polymeric nature. Suitably, the sheeting is a metal foil, preferably an aluminium foil. The foil may be pleated. Furthermore, the foil sheeting may be covered with a lacquer for decorative purposes or to increase the lifetime of the roof flashing.

The foil sheeting may advantageously have a thickness of a magnitude from 0.1 to 0.5 mm.

When the composite layer in covered on only one side by a foil sheeting the other side may be covered with a release film. The release film is intended to be removed before the flashing is applied. In the event the composite layer is tacky or the composite layer is supplied with an adhesive, the roof flashing can adhere to the building structures to secure a tighter fit.

The adhesive which may be used to attach a non-tacky composite layer, or a composite layer not sufficient tacky, to the foil sheeting or the release film may be any suitable type which can provide a tackiness of a sufficient strength. On some aspects of the invention it is preferred to use a double adhering tape as a further layer between the composite layer and the foil sheeting or release layer.

At the interface between the composite layer and the foil sheeting it may be advantageous to use a friction reducing agent. Examples of suitable friction reducing agents are graphite and molybdenum sulphide.

In order to improve the overall capability of stretching, for example in order to negotiate roof surfaces in the form of undulated tiles with very deep troughs, the flashing may be corrugated in one or two directions.

The roof flashing of the present invention may be prepared following conventional lamination techniques. As an example of suitable processes for the production of the roof flashing according to the invention, the follow processes are provided as guidance.

Initially a fluid composite material containing the carrier as well as the non-structural constituents is prepared. The carrier materials, which may be used, are usually solid at normal ambient temperatures. Therefore, the carrier material is heated at least until the viscosity of the melted carrier material is sufficiently low for allowing stirring thereof. Then, the non-structural constituents are added to the liquid carrier material and the non-structural constituents are dispersed in the carrier material by stirring. Preferably the stirring is continued until the non-structural constituents are uniformly dispersed in the carrier material.

The liquid composite material comprising the dispersed non-structural constituents are applied to a foil sheeting, generally an aluminium foil, in a desired thickness. Optionally, a second Foil sheeting is applied to the free face of the composite layer to obtain a three-layered laminate. Subsequently, the composite layer material is hardened by cooling to an appropriate temperature.

An alternative to this process is to prepare the composite layer separately and subsequently laminate the composite layer to foil sheetings on one or both sides thereof. If the composite layer material is tacky at normal or slightly increased temperatures it is possible to prepare a sheet or lane of the composite layer by casting the liquid composite material and subsequent harden the layer by reducing the temperature. The solid tacky layer is in a separate process laminated to the foil sheeting. When only one of the sides of the composite layer is covered with a foil sheeting the other side can be covered with a release film. The release film is intended to be removed before application of the roof flashing.

In the event that the composite material is not tacky and the alternative process is used, it is suitable to apply an adhesive between the composite layer and the foil sheeting.

It may be desired to treat the interface between the foil sheeting and the composite layer with a suitable friction reducing agent during the preparation of the laminate to ensure that the structure will not delaminate during stress applied to the final roof flashing. Examples of suitable friction reducing agents are MoS, and graphite.

DETAILED DESCRIPTION OF THE DRAWING

The invention will now be explained in detail with reference to the drawing, in which FIG. 1 shows a roof flashing in a perspective view.

EXAMPLE

Preparation of a Roof Flashing with a Laminate Structure.

A lane of composite material is prepared. Initially, 14 kg butyl rubber (styrene-butadiene radial block copolymer) is melted. During stirring of the melted polymer 1 kg carbon black and 85 kg particulate barium sulphate is added. When the carbon black and the barium sulphate is uniformly distributed in the liquid butyl rubber a lane in cast. The lane is solidified by allow it to cool to ambient temperature. The obtained composite material has a density of 2.7 g/ml and has a high tackiness.

A lane of aluminium foil with a width twice the width of the composite lane is acquired. In a lamination apparatus the aluminium foil is bended around one of the edges of the composite lane and an adhesive is applied at the interface between the aluminium foil and the composite lane. A five-layer roof flashing is obtained.

In the embodiment shown in the figure, the roof flashing comprises a rail element 10 and a skirt element 20. The rail element is attached to the skirt along an edge thereof and serves as a connecting element between the skirt and, for example, the main frame of a window installed in an inclined roof. The rail element comprises a number of elements 11, 12, 13, 14, 15 serving as connecting elements for the window and/or roof. As they are not relevant for the understanding of the present invention, they will not be further described.

The skirt 20 is shown in partial cut-away representation from which it can be seen that the skirt comprises a five-layer laminated structure: an upper covering layer 21, a top intermediate layer 22, a core layer 23, a lower intermediate layer 24 and a lower covering layer 25.

The upper and lower covering layers 21, 25 are aluminium foils which have been attached to the composite layer 23 by means of adhesive layers 22, 24. In case the composite layer has sufficient adhesive properties itself or adhesion between the upper and lower covering layers and the core layer is not deemed necessary, the intermediate layers can be dispensed with, the latter especially in the case where the covering layers are formed as a single foil bend around the free edge 26 of the core layer.

In the shown embodiment, the skirt is corrugated in a direction along its free edge.

As also indicated in the introductory portion of the present application, the skirt layer is the main component of the flashing with regard to securing a well-fitting, stable and secure sealing joint between an window element and a roof surface. In order to secure this, the skirt shall ideally provide for an easy mounting procedure, which ensures that the skirt is firmly and closely mounted onto the roof surface and stays in this position regardless of time and outer influences. In order to achieve this, the composite material according to the invention is easy to bend by hand, has a relatively high weight as well as a low elasticity.

What is claimed is:

1. A pliable, ductile plate-shaped roof flashing having a laminate structure, the laminate comprising a composite layer and a foil sheeting on one or both sides of the composite layer, characterized in that the composite layer comprises a carrier material and one or more non-structural constituents, at least one of said non-structural constituents comprising a heavy metal compound having a density higher than 3.5 g/ml.

2. The roof flashing according to claim 1, wherein the density of the heavy metal compound is 4.5 g/ml or higher.

3. The roof flashing according to claim 1, wherein the non-structural constituent comprises the heavy metal compound as metal particles.

4. The roof flashing according to claim 1, wherein the non-structural constituent comprises the heavy metal compound as metal bound in a chemical compound.

5. The roof flashing according to claim 1, wherein the heavy metal of the compound is selected among barium, iron, silver and copper.

6. The roof flashing as defined in claim 4, wherein the non-structural constituent is barium sulphate.

7. The roof flashing according to claim 1, wherein the composite layer material as further non-structural constituent comprises a filamentous material.

8. The roof flashing according to claim 7, wherein the filaments of the non-structural material have a length, which is less than 10 cm, preferably less than 5 cm and more preferably less than 1 cm.

9. The roof flashing according to claim 7, wherein the filaments are arranged with a predominant orientation.

10. The roof flashing according to claim 1, wherein the non-structural material constitutes up to 95% by weight of the composite layer material.

11. The roof flashing according to claim 1, wherein the non-structural material constitutes more than 50% by weight of the composite layer material.

12. The roof flashing according to claim 1, wherein the non-structural material constitutes more than 75% by weight of the composite layer material.

13. The roof flashing according to claim 1, wherein the foil sheeting is a thin metal foil having a thickness of a magnitude from 0.1 to 0.5 mm.

14. The roof flashing according to claim 13, wherein the metal foil is constituted by aluminium.

15. The roof flashing according to claim 1, wherein the density of the composite layer material is 2.5 g/ml or higher.

16. The roof flashing according to claim 1, wherein a rail is attached along a side of the plate-shaped roof flashing, the rail being adapted for connecting to a building element.

17. The roof flashing as defined in claim 1, wherein the plate-shaped roof flashing is corrugated.

18. The roof flashing according to claim 1, wherein the foil sheeting comprises a pleating.

* * * * *